Figure 1:
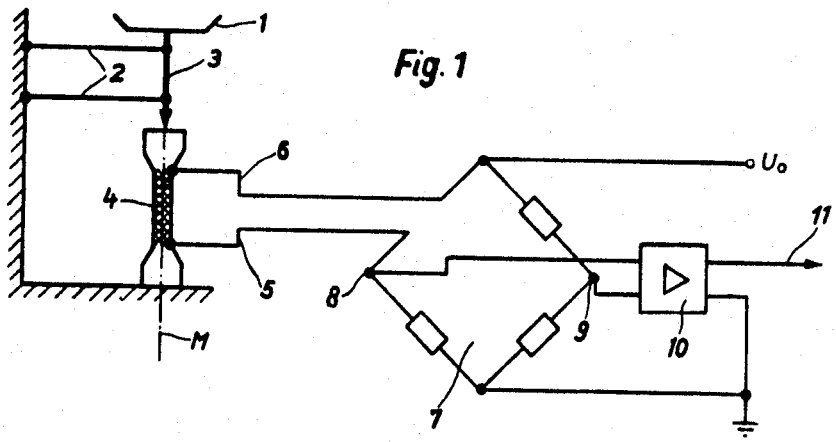

United States Patent

[11] 3,625,299

| [72] | Inventor | Manfred Kammerer<br>Ebingen, Germany |
|---|---|---|
| [21] | Appl. No. | 838,894 |
| [22] | Filed | July 3, 1969 |
| [45] | Patented | Dec. 7, 1971 |
| [73] | Assignee | August Sauter KG. a<br>Kommanditgesellschaft<br>Ebingen, Germany |
| [32] | Priority | July 24, 1968 |
| [33] | | Germany |
| [31] | | P 17 74 599.2 |

[54] ELECTRONIC SCALE APPARATUS
3 Claims, 3 Drawing Figs.

[52] U.S. Cl. .................................................. 177/211, 73/141 A
[51] Int. Cl. .................................................. G01g 3/14
[50] Field of Search ........................................ 177/210, 211; 73/95, 141 A

[56] References Cited
UNITED STATES PATENTS

| 2,493,029 | 1/1950 | Ramberg ................ | 73/141 A X |
| 2,614,416 | 10/1952 | Hollmann ............... | 73/141 A |
| 2,868,535 | 1/1959 | Ruge ...................... | 177/211 X |
| 3,084,300 | 4/1963 | Sanchez .................. | 177/211 |
| 3,332,506 | 7/1967 | Bradfield ................ | 177/210 |

Primary Examiner—Richard B. Wilkinson
Assistant Examiner—George H. Miller, Jr.
Attorney—Ernest F. Marmorek ABSTRACT: An electronic scale apparatus comprising a member capable of undergoing deformations resulting in changes of the inner mechanical tensions thereof upon the application of a force thereto and consequently undergoing a change of the electrical resistance thereof, a bridge circuit connected to include such member to develop a signal according to the change of the electrical resistance of such member, and output means producing an indication of the force in response to the signal.

PATENTED DEC 7 1971　　　　　　　　　　　　　　3,625,299

ELECTRONIC SCALE APPARATUS

The present invention relates to an electronic scale in which the force to be measured operates on a body capable of being deformed and, in which the resulting deformations and inner mechanical stresses affect the state of an electrical circuit connected to such body.

Force measuring devices of similar type are known and, in one of such devices a pressure gauge and a strain gauge is used. The pressure gauge contains two elements, a body capable of being deformed which is commonly a metal member having predetermined mechanical properties and, a strain gauge such as a paper or plastic material having an electrically conductive material carried thereon and, the electrical conductivity of which changes with or under mechanical pull or pressure effects. These two elements are glued together. The fact that gluing of these two elements is necessary, an additional source of error is created which in turn necessarily leads to a limitation of the accuracy of such pressure gauges. In addition, the properties of the body undergoing the deformation as well as the physical properties of the strain gauge vary with temperature variations.

It is, therefore, an object of the present invention to eliminate the above-described shortcomings of known electrical scales by providing an improved electronic scale.

In accordance with the invention, a single mask or member is provided to perform the translation of the applied force into a deformation as well as into a change affecting the state of an operatively connected electrical circuit. According to the invention such mass comprises a piezoresistive semiconductor element which possesses a good ratio of relative electrical resistance change with respect to the relative mechanical stress or strain change therein.

According to a preferred embodiment of the invention, the semiconductor element is in an elongated form having at its intermediate portion a reduced cross section which is doped with a predetermined type of doping material.

An electronic scale adapted for the measuring of larger forces requiring more stringent linearization comprises, according to the invention, a pair or more semiconductor force transducers which are mechanically connected in series and, in which, the measuring force or the force to be measured operates on a plate joining the adjacent force transducers, whereby one of the adjacent force transducers undergoes a pulling, the other undergoes a pressure effect.

According to another feature of the invention an especially sensitive electronic scale may be provided by applying the force to be measured perpendicularly to the longitudinal axis of the elongated semiconductor transducer in which a face portion to which the force to be measured to be applied is doped as well as a face portion located oppositely thereto.

In the above-described embodiments of the inventive electrical scale the semiconductor force transducers are preferably placed in a bridge circuit and affect the balance of the bridge which in turn is an indication of the force operating on the semiconductor force transducers.

Figure 2:
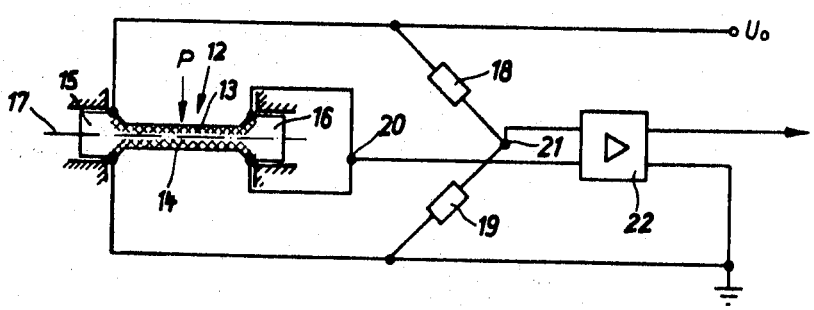
Figure 3:
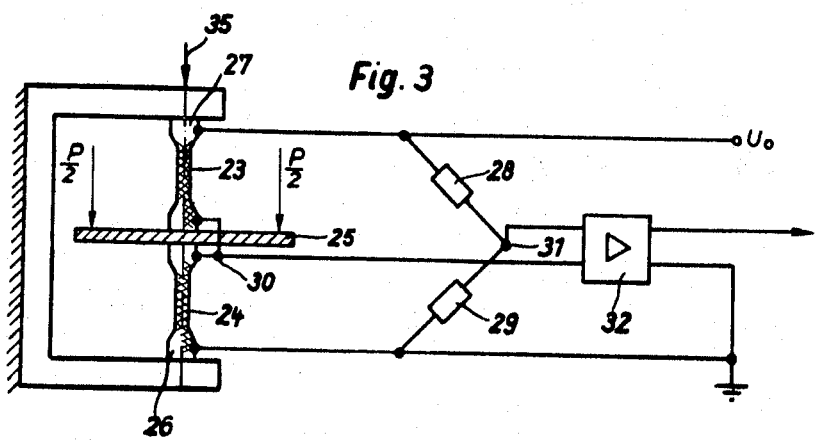

The invention will become more readily apparent from the following description of preferred embodiments thereof shown in the accompanying drawings, in which:

FIG. 1 is a schematic representation of an electrical scale according to the invention have a scale pan located to apply the force to be measured to the semiconductor force transducer in an axial manner and, also showing the electrical connection of the transducer;

FIG. 2 is an illustration to FIG. 1 in which, however, the force to be measured is applied to the semiconductor force transducer perpendicularly to its longitudinal axis and, in which the transducer itself is connected into the bridge circuit in a different manner than the one in FIG. 1; and FIG. 3 is a further embodiment of the invention according to which several or at least a pair of semiconductor force transducers are mechanically connected in series.

With reference to FIG. 1 it is seen that a scale 1 is provided with a top located pan which through a pan support 3 guided in a parallel manner in a housing by means of leaf springs 2 rests on a force transducer body 4 capable of undergoing deformations and having a cylindrical or prismatic shape. The body 4 is a semiconductor element such as a silicon crystal. Body 4 has at its intermediate portion a reduced cross section which is doped to exhibit P- and/or N-type of conductivity. The remaining thicker end portions of body 4 serve as terminals for electrical conductors 5 and 6 also to provide the mechanical connection of body 4 to the remaining part of the scale.

A force P to be measured is applied on the upper end portion of body 4 in axial direction with respect to its crystal axis N. This force P creates in body 4 a change of its mechanical stress conditions which, in turn, on basis of the piezoresistive effect, results in a simultaneous change of its electrical conductivity. The change of resistance appearing between conductors 5 and 6 creates a diagonal voltage appearing between terminals 8 and 9 of the diagonal branch of bridge 7, the remaining connections of which are not described here in detail for obvious reasons.

The diagonal voltage of the bridge is fed into an amplifier 10 which at its output 11 has a load or indicator device connected thereto which is not shown in the drawing. The load or indicating device is adapted to indicate the force directly in force units or use the created signal in any other manner.

FIG. 2 illustrates another embodiment of the invention in which the semiconductor force transducer 4 is loaded perpendicularly with respect to its longitudinal axis. The semiconductor body 4 is in its intermediate portion or zone 12 reduced in cross section. This zone 12 is not doped throughout the entire cross section thereof but only on oppositely facing surfaces 13 and 14 on one of which, illustratively shown as surface 13, the force P to be measured is applied while surface 14 is oppositely located. By this doping arrangement two oppositely located electrical conducting paths are created. The thicker end portions 15 and 16 serve as terminals and for the mechanical support of the semiconductor transducer body 4. Force P is applied in the middle of doped zone 12 in a direction perpendicular to the longitudinal axis 17 of the semiconductor body 4. The conducting path formed by doped surface 13 is in the illustrated embodiment undergoing mechanical pressure while the conducting path formed by doped surface 14 is undergoing a pulling effect. Both conducting paths 13 and 14 form a branch of bridge 7. The other branches are formed by resistances 18 and 19. In the resulting bridge circuit the diagonal voltage is taken off at terminals 20 and 21 and fed through an amplifier 22 into a load or indicator device not shown in the drawing for purposes mentioned above.

As a result of the opposite mechanical loading of conducting paths 13 and 14 and, as a result of their connection into the bridge circuit, the upsetting of the bridge balance becomes twice as large when the force P to be measured is applied. This force transducer is practically twice as sensitive than the force transducer illustrated in FIG. 1. The advantage of the force transducer according to FIG. 2 and of the associated circuit resides in that the different influences such as the linearization of the force-resistance characteristics, the temperature coefficients and the temperature on both surfaces 13 and 14, are balanced. This embodiment is more adapted for the measuring of smaller forces.

The embodiment according to FIG. 3 combines the advantages of the embodiment of FIG. 1 with that of the embodiment of FIG. 2.

In this embodiment the force to be measured is illustratively shown as split in two halves P/2 and is applied on a plate member 25 which is placed between two adjacent force transducers 23 and 24. The pan of the scale applies the force on plate member 25. The end portions 26 and 27 of force transducers 23 and 24 serve to fixedly secure the transducer within a frame or like means. The transducers 23 and 24 form with resistances 28 and 29 an electrical bridge circuit, the diagonal branch 30 and 31 of which feeds its output through an amplifier 32 into a load or indicator device not shown for purposes mentioned above.

At the stationary fixing it is assumed that the distance A of the fixing device (FIG. 3) is equal to the total distance of the parts 23 plus 25 plus 24; in other words, the force transducers 23 and 24 are not subject to any measuring force. This corresponds to a working point of zero. If the force transducers 23 and 24 are subjected to an unchanging preload 35, for instance of 5 kilograms while loading the plate member 25 with 0.5 kilogram, there is created for the force transducer 23 a tensile load of 5 kg. minus 0.5 kg. and for the force transducer 24 a pressure load of 5 kg. plus 0.5 kg. Through the initial loading 35 there is created in the foregoing example a positive connection of the parts, whereby the working point will be changed from zero to 5 kg.

The force P to be measured loads the transducers 23 to result in a pulling effect and loads, at the same time, transducer 24 to result in a pressure effect. Assuming doping and similar semiconductor materials for both transducers 23 and 24, the resistance changes in transducer 24 are, for instance, positive, and the resistance changes in transducer 23 are, for instance, negative at the same time. The electrical bridge is thereby influenced twice as much in upsetting its balance. The absolute resistance values and the eventual changes thereof through temperature effects have practically no effect on the upsetting of the bridge balance in view of the connection of the transducers into the bridge circuit.

Instead of providing a fixed connection of the end portions 27, the force transducers 23 and 24 may be exposed to a bias loading as shown at 35 in order to effect a shift in the operating point of them.

As need arises, several semiconductor force transducers can be used according to the invention in parallel or series connections as an extension of the inventive idea described in connection with the embodiment of FIG. 3.

From the above it will be apparent that this invention provides a novel electrical scale apparatus which fulfills all of the objects for the invention. While the invention has been shown and described with reference to particular embodiments thereof, of course it will be obvious to those skilled in the art that the invention will have many types of embodiments other than those shown. Thus it will be apparent that the invention is not to be considered as limited by the drawing and description but only as to its spirit and scope as it is set forth in the appended claims.

I claim:

1. An electronic scale apparatus comprising at least one single piece semiconductor piezoresistive portion capable of undergoing deformations resulting in changes of the inner mechanical tensions thereof upon the application of a force thereto and consequently undergoing a change of the electrical resistance thereof, bridge circuit means connected to include said portion to develop a signal according to said change of the electrical resistance of said portion, and output means producing an indication of said force in response to said signal, wherein said semiconductor portion is in an elongated form having a zone comprising a pair of opposite faces, each of said faces being doped to provide a pair of separate electrical paths, said force being applied to one of said faces, each of said paths constituting a branch in the bridge circuit.

2. The electronic scale apparatus as claimed in claim 1, wherein each of said faces being connected into a different branch of said bridge circuit means.

3. In an electronic scale apparatus, as claimed in claim 1, said zone having a reduced cross section.

* * * * *